United States Patent [19]

Monzello

[11] Patent Number: 5,584,065
[45] Date of Patent: Dec. 10, 1996

[54] INTERFERENCE CANCELLATION SYSTEM EMPLOYING AN I/Q QUADRATURE ROTATOR

[75] Inventor: Roy C. Monzello, Agoura Hills, Calif.

[73] Assignee: American Nucleonics Corporation, Westlake Village, Calif.

[21] Appl. No.: 322,686

[22] Filed: Oct. 13, 1994

[51] Int. Cl.$^6$ .................................... H04B 1/10
[52] U.S. Cl. .......................... 455/296; 455/84; 455/278.1; 375/346
[58] Field of Search ................... 455/278.1, 296, 455/295, 304, 305, 306, 214, 289, 272, 273, 84, 24, 63; 375/346

[56] References Cited

U.S. PATENT DOCUMENTS

| | | | |
|---|---|---|---|
| 3,699,444 | 10/1972 | Ghose et al. | |
| 4,599,732 | 7/1986 | LeFever | 375/346 |
| 5,117,505 | 5/1992 | Talwar | |
| 5,125,108 | 6/1992 | Talwar | |
| 5,140,699 | 8/1992 | Kozak | 455/278.1 |
| 5,428,831 | 6/1995 | Manzello et al. | 455/278.1 |

Primary Examiner—Reinhard J. Eisenzopf
Assistant Examiner—Doris To
Attorney, Agent, or Firm—Hoffmann & Baron

[57] ABSTRACT

An interference cancellation system for cancelling interfering signals which is adapted to be connected to a radio receiver system having a receiver antenna, a receiver and a receiver transmission line interconnecting the receiver antenna and the receiver includes an auxiliary antenna, a first directional coupler connected to the auxiliary antenna, a second directional coupler or error coupler connected to the receiver transmission line, a synchronous detector connected to the first and second directional couplers, a vector rotator connected to the outputs of the synchronous detector, a signal controller connected to the vector rotator and a third directional coupler or summer coupler connected to the receiver transmission line and to the signal controller. The vector rotator enables the internal time match of the cancellation system to be optimized by quadrature positioning by varying resistor values in the vector rotator circuit. After the match is optimized, the phase position between the reference signal path and error signal path can be set independently of the time match.

12 Claims, 3 Drawing Sheets

INTERFERENCE CANCELLATION SYSTEM EMPLOYING AN I/Q QUADRATURE ROTATOR

BACKGROUND OF THE INVENTION

1. Field of the Invention

This invention relates to radio communication systems and methods, and more particularly relates to interference cancellation systems and methods for minimizing or eliminating interference in radio receivers due to unwanted signals. Even more specifically, this invention relates to a cancellation system and method which permits alignment of quadrature or phase position independently from the time match.

2. Description of the Prior Art

FIG. 1 is a functional diagram of a traditional interference cancellation system 1 having a reference input port 2 for providing a reference sample of an interfering signal, and a receiver antenna 4 for providing a receive signal on receiver transmission line 6 which couples the receiver antenna to a receiver 7. In order to obtain a sample of the interfering signal, reference input port 2 may be coupled to an auxiliary antenna (not shown), for example, if the receiver and source of the interfering signal are not collocated. Alternatively, the reference input port 2 may be directly coupled to the interfering signal source if the source and receiver are collocated. The received signal includes a desired signal component plus an interfering signal component.

The traditional interference cancellation system further includes a directional coupler 8 operatively connected to the reference input port 2 in order to provide an interfering signal sample on line 10 to a synchronous detector 12. The interfering signal sample is also provided via line 13 to a signal controller 14 which is operatively connected to the reference input port 2. The traditional interference cancellation system also includes a directional coupler 16 which is operatively connected to the receiver transmission line 6, for providing a sample of the received signal to the synchronous detector 12 via line 18.

The synchronous detector 12 receives both the interfering signal sample or reference signal via line 10 and a sample of the received signal via line 18. Thereafter, the synchronous detector compares the interfering signal sample with the received signal sample and essentially detects the portion of the received signal sample (i.e., the interfering signal component) that is coherent with the interfering signal sample. The synchronous detector 12 then provides DC output signals on its output ports which correspond to differences in amplitude and phase between the interfering signal sample and the coherent signal component of the received signal.

The traditional interference cancellation systems also include amplifiers and/or integrators 20 which are connected to the outputs of the synchronous detector 12 so that the DC output signals will be amplified and/or integrated to effectively create DC control signals, which are provided via lines 21, 22 to the signal controller 14.

The signal controller 14, also commonly known as a vector modulator, is regulated by the DC control signals provided by the synchronous detector 12 and integrator/amplifiers 20 of closed loops. As previously described, a first input of the signal controller is provided with an interfering signal sample from the reference input port 2 via line 13. Additionally, two other inputs of the signal controller receive the control signals from the integrator/amplifier 20 via lines 21, 22. The output port of the signal controller is operatively coupled to a directional coupler 23. A cancellation signal generated by the signal controller is provided on the signal controller output port to the directional coupler 23. Receiver transmission line 6 is operatively coupled to directional coupler 23 such that the cancellation signal is injected into the receiver transmission line carrying the received signal. Specifically, the cancellation signal, when injected into receiver transmission line 6, effectively cancels the interfering signal component from the received signal.

In the conventional interference cancellation system of FIG. 1, the signal controller (or vector modulator) and synchronous detector are typically quadrature devices. Quadrature vector modulators are commonly used in interference cancellation systems to adjust the amplitude and phase of a reference signal (such as on reference port 2) which is then injected as a cancellation signal into the receiver system to eliminate or minimize the effect of an interfering signal component in a received signal.

As previously noted, in order for the cancellation to take place, the cancellation signal from the signal controller and sample of the received signal must arrive at directional coupler 23 with the same amplitude and opposite phase (i.e., 180 degrees out of phase). This is commonly achieved by the synchronous detector 12. However, if this phase relationship is to be attained over a broad bandwidth, the time delay between the reference signal path and the sample of the received signal via directional coupler 16 to the synchronous detector 12 must be matched by the time delay between the two signals. A time mismatch of ΔT will cause a phase difference, Δφ, given by the following equation:

$$\Delta\phi = 2 \times \pi \times F_o \times \Delta T$$

where $F_o$ is the frequency of the interference signal and π is approximately equal to 3.14. As noted above, the overall phase difference Δφ can be made to approach zero.

However, at another frequency, F, there will still be a phase difference, as shown in the following equation:

$$\Delta\phi = 2 \times \pi (F - F_o) \times \Delta T$$

Even though good cancellation may be achieved at frequency $F_o$, the cancellation may be only partial at frequency F, or there may be no cancellation or even an enhancement of the interference signal received by the radio receiver.

This is illustrated by FIG. 2, which is a graph of the degree of cancellation as a function of frequency for a time mismatch of 1.0 nsec, as well as for 0.1 nsec. In the example shown in FIG. 2, the phase has been adjusted so that at frequency $F_o$, the degree of cancellation is reduced. For example, at about 160 MHz or more from frequency $F_o$, the interference signal is actually enhanced when the time mismatch is 1.0 nsec or greater. Accordingly, it is essential that there be a time match apart from amplitude match in achieving a high degree of cancellation across a defined bandwidth in an interference cancelling system. Such amplitude and time match is achieved by using an attenuating means such as a pad, and a delay line in the reference signal.

Thus, in a conventional interference cancellation system, a disadvantage of the system is that in most cases, the reference signal antenna and the receiver antenna must be spaced apart from one another so that there is a phase difference between the reference signal and the sample of the received signal taken from the receiver antenna. This phase difference is necessary so that the adaptive control loop of the cancellation system and in particular the synchronous detector 12 of the loop, can distinguish between the two signals and provide a proper detector output signal to the signal controller.

Another disadvantage of conventional cancellation systems is that they depend upon very accurate matching the propagation delay time of the reference signal path and the sample of received signal. In addition, the relative phase of the reference signal path and the cancellation or error signal path must be adjusted for stable loop performance by aligning the internal phase quadrature of the system (i.e., a positive incremental change in the output of the Q integrator 20 must cause a positive change in the output of the synchronous detector 12 for an inverting integrator design). The internal phase quadrature of the system will hereto be referred as quadrature position. For stable, optimum performance, the quadrature position variation with frequency should be minimized. Most times, due to dissimilar components in the reference signal path and error signal path, these two requirements are conflicting. The final result is a compromise on time match in order to meet the primary requirement of loop stability.

OBJECTS AND SUMMARY OF THE INVENTION

It is an object of the present invention to provide an interference cancellation system which is adapted to minimize or eliminate unwanted signals arriving at a radio receiver.

It is an object of the present invention to provide an apparatus and method to enable the internal time match of the cancellation system to be optimized by permitting the phase position between a reference path and an error path to be set independently of the time match of the system.

It is yet a further object of the present invention to provide an interference cancellation system having improved performance and producibility by changing the conventional method of quadrature positioning from one of RF cable adjustment to one of resistor value adjustment.

It is yet a further object of the present invention to provide an interference cancellation system and method which overcomes the inherent disadvantages of known interference cancellation systems and methods.

In accordance with one form of the present invention, an interference cancellation system for connection to a radio receiver system having a receiver antenna, a receiver and a receiver transmission line interconnecting the receiver antenna and the receiver, includes an auxiliary antenna for receiving one or more interfering signals, the auxiliary antenna providing a reference signal corresponding to the interfering signals received by the auxiliary antenna, and a first directional coupler coupled to the auxiliary antenna and providing a reference signal thereon. An amplifier/limiter is coupled to the first directional coupler.

The interference cancellation system further includes a second directional coupler coupled to the receiver transmission line. The second directional coupler provides a sample signal or error signal corresponding to the interfering and desired signals received by the receiver antenna.

A synchronous detector is further included in the interference cancellation system. The synchronous detector has at least two inputs which are respectively effectively coupled to the first and second directional couplers so that the synchronous detector is provided with the reference signal and the error signal. The synchronous detector compares the reference signal and error signal and provides at least one detector output signal.

The interference cancellation system further includes a vector rotator or I/Q quadrature rotator having at least a first and second output and a first and second input. The inputs being electrically coupled to the outputs of the synchronous detector for receiving signals therefrom. The vector rotator provides quadrature alignment of the signals input thereto and generates an output rotated vector signal therefrom.

The interference cancellation system of the present invention further includes a signal controller. The signal controller includes a first input which is coupled to the output of the first coupler for receiving a reference signal, and at least a second input which is coupled to the output of the vector rotator to receive the control signal therefrom. The signal controller provides a cancellation signal which corresponds to the reference signal adjusted in phase and amplitude to cancel the interfering signal received by the radio receiver system. The cancellation signal is injected into the radio receiver system by a summing coupler coupled to the transmission line of the radio receiver system. The signal controller may include an integrator/amplifier to integrate and amplify the output rotator vector signals.

In accordance with the present invention, the vector rotator comprises an analog circuit to rotate the signal vector quadrature components of an input signal. The vector rotator is in the form of an analog circuit and the angular rotation accomplished by the vector rotator is adjusted via resistive values within the analog circuit. The vector rotator enables the interference cancellation system of the present invention to optimize the internal time match and, independently, adjust the phase position between the reference signal path and the error signal path. The interference cancellation system of the present invention improves performance and producability over known cancellation systems. Also disclosed is a method for substantially cancelling an interfering signal component from a received signal using the system described above.

These and other objects, features and advantages of this invention will be apparent from the following detailed description of illustrative embodiments thereof, which is to be read in connection with the accompanying drawings.

DETAILED DESCRIPTION OF THE PREFERRED EMBODIMENTS

Figure 1:
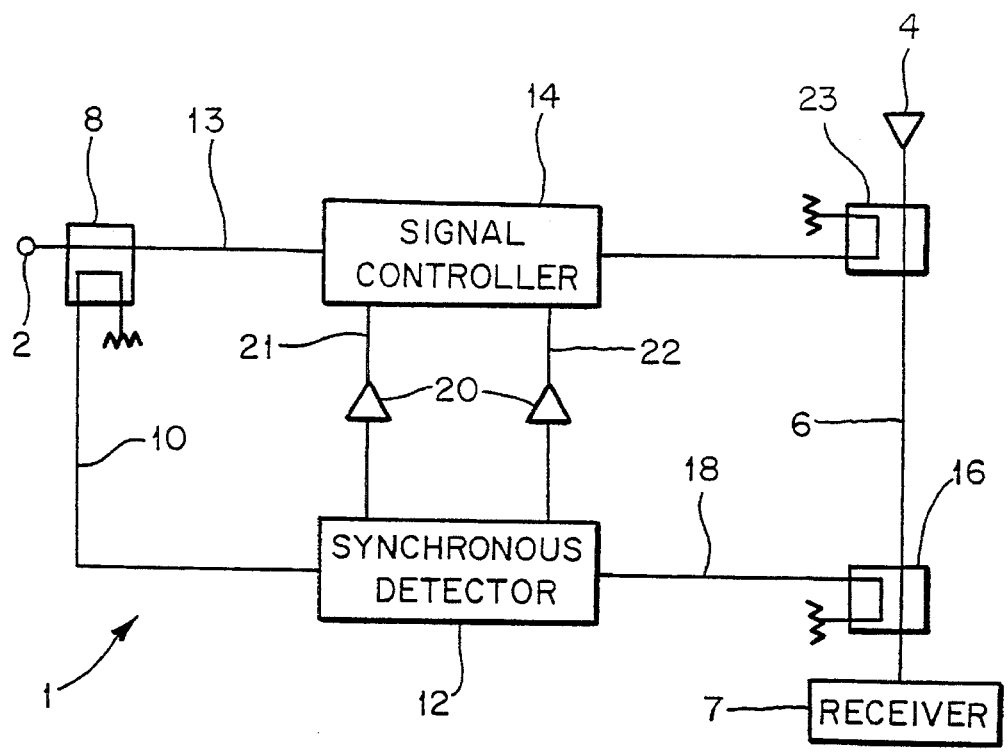
FIG. 1 is a block diagram of a conventional interference cancellation system.
Figure 2:
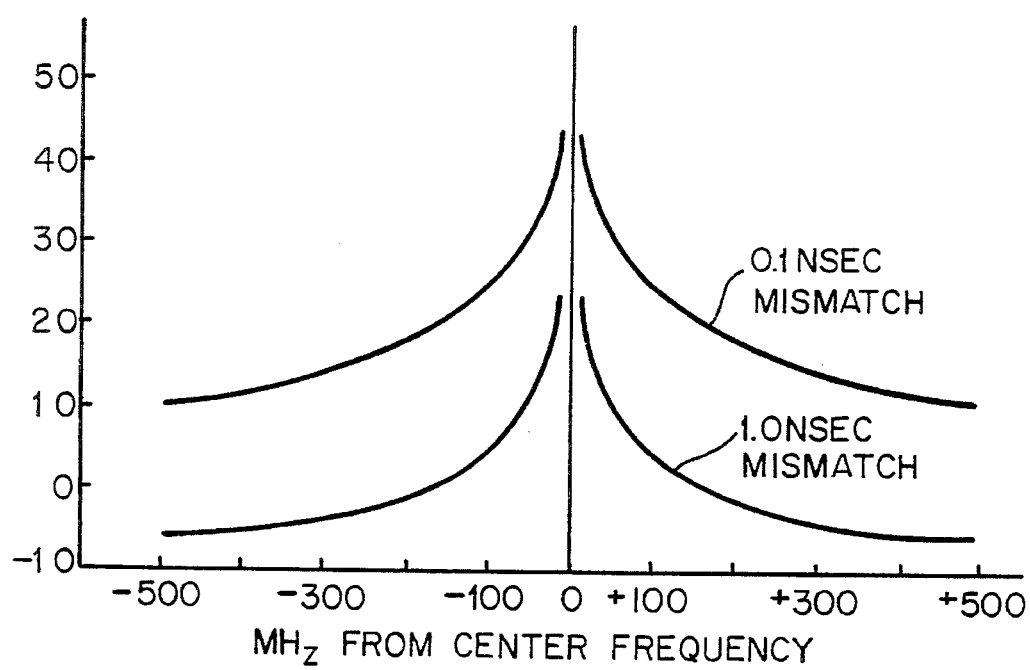
FIG. 2 is a graph depicting the relationship between the degree of cancellation and the affect on such cancellation caused by a change in the frequency of the interfering signal and the difference or mismatch between the interfering signal path between the transmitter and receiver and the cancellation sample signal path.
Figure 3:
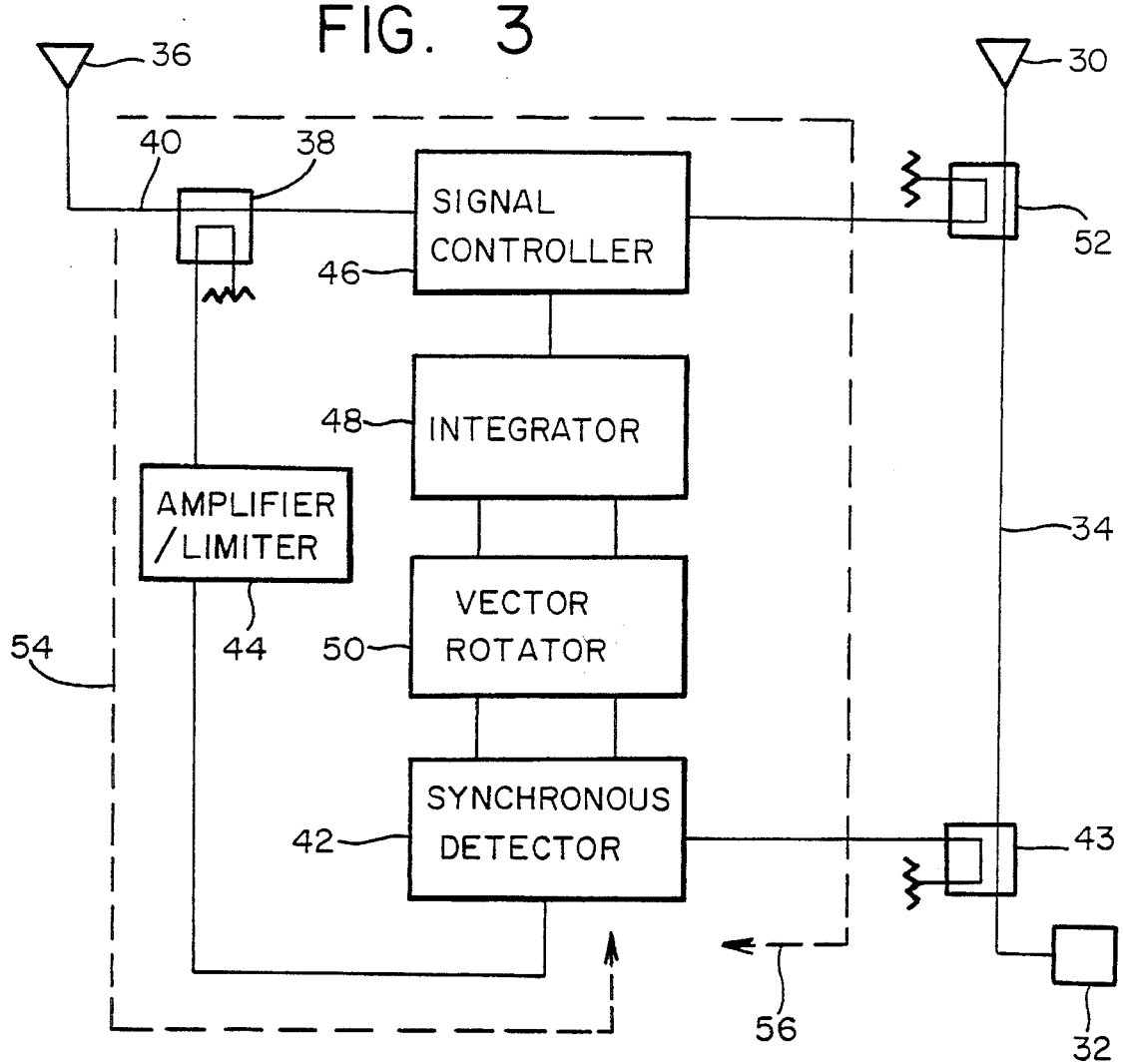
FIG. 3 is a block diagram illustrating one form of the present invention.

FIG. 3 illustrates functionally one form of the interference cancellation system of the present invention. The interference cancellation system is adapted to be connected to a radio receiver system having a receiver antenna 30, a receiver 32, and a receiver transmission line 34 connecting the receiver antenna 30 with the receiver 32. The receiver antenna receives an interfering signal and a desired signal, as sometimes may occur when a receiver and transmitter are collocated, which signals are provided to the receiver 32 by the transmission line 34.

The interference cancellation system includes an auxiliary antenna 36 for receiving the interfering signal. The auxiliary antenna 36 is connected to a first directional coupler 38 by a transmission line 40, and provides to the directional coupler 38 a reference signal which corresponds to the interfering signal received by the auxiliary antenna 36. One output of the first directional coupler 38, also known as a reference coupler, is connected to an input of a synchronous detector 42 through an amplifier and limiter circuit 44. The amplifier and limiter circuit 44 amplifies the reference signal provided to the synchronous detector 42. The other output of the first directional coupler 38 is provided to an input of a signal controller 46. The first directional coupler 38 thus provides a portion of the reference signal to the synchronous detector 42, as well as to the signal controller 46.

The interference cancellation system further includes a second directional coupler 43, also known as an error coupler. The error coupler 43 is electrically coupled to the receiver transmission line 34, and has an output on which is provided a sample signal corresponding to the signals received by the receiver antenna 30.

The interference cancellation system includes a synchronous detector 42 having at least two input ports (i.e., a reference port and an error port) which are respectively electrically coupled to the outputs of the first and second directional couplers 38, 43 so that the reference signal and the sample error signal are provided to the two inputs of the synchronous detector.

The synchronous detector 42 is basically a quadrature phase detector. A typical synchronous detector which is suitable for use is described in U.S. Pat. No. 3,699,444 which issued to Rabindra Ghose and Walter Sauter, the disclosure of which is incorporated herein by reference. The synchronous detector 42 compares the reference signal and the sample error signal and provides one or more detector output signals.

The synchronous detector 42 may be regarded as a switch controlled by zero-crossing of the reference signal to the detector. Because the synchronous detector is referenced to the interference signal (i.e., the reference signal), a non-zero sample signal will cause the synchronous detector 42 to output a DC detector output signal. An amplifier and/or an integrator 48 may be included in the interference cancellation system. In the present invention, a vector rotator 50, which will be described in greater detail below, is coupled to the outputs of the synchronous detector 42. An integrator 48, is coupled to the output of the vector rotator 50. The integrator/amplifier 48 receives the DC output signals of the synchronous detector 42 through the vector rotator 50 and amplifies and integrates these signals to create control signals. The integrator control signals are provided to the signal controller 46 of the interference cancellation system.

As previously described, the synchronous detector 42 includes two inputs for receiving the reference signal and the error signal. The error signal is essentially a sample of the desired signal received by the receiver antenna 30 and the receiver 32, and the residual interfering signal present after the cancellation signal is injected on to the transmission line 34. The interference cancellation system may also include an amplifier (not shown) for amplifying the error signal prior to being input to the synchronous detector 42. The synchronous detector also includes two outputs on which are respectively provided analog in-phase and quadrature phase DC signals that correspond to the amplitude of the residual in-phase and quadrature phase components (i.e., the i and q quadrature unit vectors) of the interfering signal. These signals are provided to the inputs of the vector rotator (I/Q quadrature rotator) 50 of the present invention.

The interference cancellation system of the present invention further includes a third directional coupler 52, which is also known as a summing coupler. The third directional coupler 52 has its output electrically coupled to the receiver transmission line 34 and its input coupled to the output of the signal controller 46.

A signal controller 46 suitable for use in the interference cancellation system of the present invention is described in U.S. Pat. No. 3,699,444, previously mentioned and incorporated herein by reference. In its simplest form, the signal controller consists of an in-phase and a quadrature-phase electronic attenuator, each being controllable by a respective DC control signal. One of its inputs is provided with a portion of the reference signal from the output of the first directional coupler 38. Another input of the signal controller receives the control signals from the amplifier/integrator 48. An output of the signal controller 46 is provided to the summer coupler 52, the summer coupler injecting the cancellation signal onto the receiver transmission line 34 carrying the received interfering and desired signals. The cancellation signal injected into the receiver transmission line is substantially equal in amplitude and opposite in phase to the interfering signal received by the receiver antenna and carried by the receiver transmission line 34 so as to substantially cancel the interfering signal on the receiver line.

The present invention is distinguishable over known interference cancellation systems by enabling the internal time match of the cancellation system to be optimized and then the phase position between the reference path and error path to be set independently of the time match. The present invention accomplishes this desired result by using the vector rotator in the interference cancellation system. The vector rotator 50 receives the output DC signals, i.e., the in-phase and quadrature phase components of the interfering signal, from the synchronous detector 42 for manipulation thereof.

Presently available interference cancellation systems depend upon extremely accurate matching of the propagation delay time of the reference signal path 54 and the error signal path 56 (FIG. 3) within the system. Additionally, the relative phase of the reference signal path and the error signal path 56 are generally fixed at some predetermined value. Often times, due to dissimilar components utilized in the two signal paths, the requirements of time matching and phase matching are conflicting. The end result is a compromise on time match in order to meet the more important condition of phase position. The present invention, by utilizing the vector rotator 50, enables the time match and phase position of the two signal paths received by the synchronous detector 42 to be set independently. On wideband situations, this independent setting of time match and phase position will improve performance. On typical cancellation systems, the use of the vector rotator of the present invention will improve producibility of the system by changing the conventional method of quadrature positioning from one of RF cable adjustment to one of resistor value adjustment.

In order to accomplish the quadrature positioning of the DC control signals (the i and q quadrature unit vectors of the interfering signal) from the synchronous detector in the interference cancellation system of the present invention, a vector rotator analog circuit has been developed. The analog circuit is based upon the following analysis of the signal vectors to be rotated in the vector rotator of the present invention.

Let the vector to be rotated be expressed as follows:

$$V_i = xi + yq = Mag\ \Delta\theta \tag{1}$$

where Mag=sqrt $(x^2+y^2)$, $\theta=\text{Tan}^{-1}$ (y/x) and
i,q are quadrature unit vectors
Since: x=MagCos$\theta$ and y=MagSin$\theta$,
$V_i$ can also be written as:

$$V_i = (Mag\text{Cos}\theta)i + (Mag\text{Sin}\theta)q \tag{2}$$

To rotate the vector, the magnitude remains constant and the angle $\theta$ changes by the desired amount of rotation as follows:

$$\text{Vector rotated} = V_r = Mag\ \Delta\theta + \phi \tag{3}$$

Equation (3) can be written in quadrature components as follows:

$$V_r = Mag\text{Cos}(\theta+\phi)i + Mag\text{Sin}(\theta+\phi)q \tag{4}$$

Using the following trigonometric identities;

Cos $(\theta+\phi)$=Cos$\theta$Cos$\phi$−Sin$\theta$Sin$\phi$ and

Sin$(\theta+\phi)$=Sin$\theta$Cos$\phi$+Cos$\theta$Sin$\phi$ equation (4) can be written as follows:

$$V_r = [Mag\text{Cos}\theta\text{Cos}\phi - Mag\text{Sin}\theta\text{Sin}\phi]i + [Mag\text{Sin}\theta\text{Cos}\phi + Mag\text{Cos}\theta\text{Sin}\phi]q \tag{5}$$

From equation (2), MagCos$\theta$=x and MagSin$\theta$=y, thus equation (6) can be written in terms of the original vector as follows:

$$V_r = [x\text{Cos}\phi - y\text{Sin}\phi]i + [y\text{Cos}\phi + x\text{Sin}\phi]q \tag{6}$$

Each of the functions, Cos$\phi$ and Sin$\phi$, are constants depending upon the amount of rotation and have values between −1 and 1 which implies that:

$$-x < x\text{Cos}\phi < x \tag{7}$$

$$-x < x\text{Sin}\phi < x \tag{8}$$

$$-y < y\text{Sin}\phi < y \tag{9}$$

$$-y < y\text{Cos}\phi < y \tag{10}$$

Figure 4:
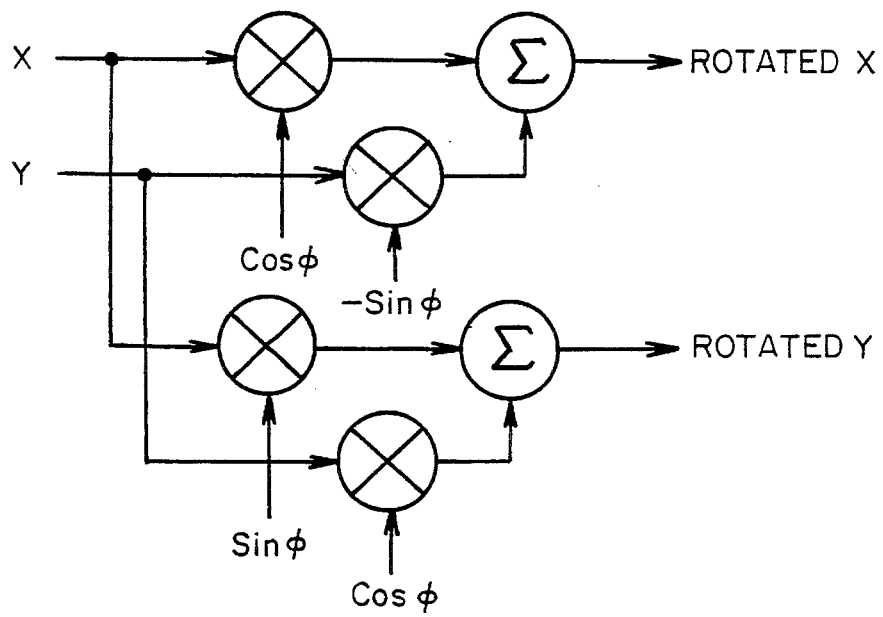
FIG. 4 is a diagrammatic illustration of the function of the vector rotator formed in accordance with the present invention.

FIG. 4 is a simplified block diagram illustrating the implementation of rotating a signal vector in accordance with equation (6) above. More specifically, to achieve a rotated x-component, x is multiplied by Cos$\phi$ and y is multiplied by minus Sin$\phi$, the xCos$\phi$ and −ySin$\phi$ being summed to produce the rotated x. Similarly, obtaining the y-component is also illustrated in FIG. 4. The rotated y-component is produced by summing yCos$\phi$ and xSin$\phi$.

Figure 5:
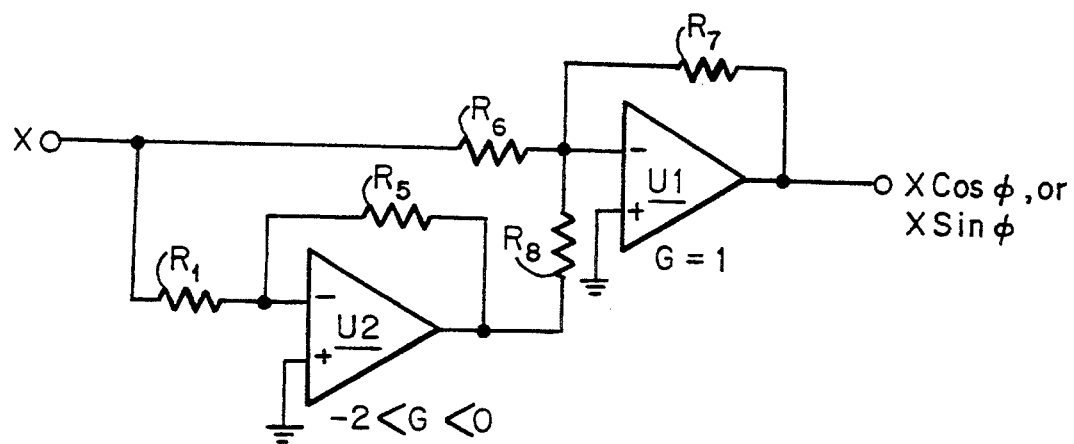
FIG. 5 is a circuit schematic illustrating an analog circuit for implementing the mathematical function required to rotate vectors.

Each of the equations (7)–(10) can be implemented using an analog circuit which is illustrated in FIG. 5. Referring to FIG. 5, the analog circuit includes two operational amplifiers U1 and U2. The input variable x is provided to the inverting inputs of both U1 and U2 through resistors R6 and R1, respectively. Operational amplifier U1 also includes feedback from its output through resistor R7 to its inverting input. The non-inverting input of U1 is coupled to ground. Additionally, an output of operational amplifier U2 is coupled through resistor R8 to the inverting input of U1. The input variable x is also provided to the inverting input of U2 through resistor R1. Amplifier U2 includes a feedback loop from the output through resistor R5 to the inverting input of U2. The non-inverting input of U2 is coupled to ground. Resistors R6, R7 and R8 are selected to have the same resistive value. Therefore, the gain of the operational amplifier U1 is minus one and the gain of amplifier U2 is less than zero but greater then minus two.

The output of the circuit illustrated in FIG. 5 in terms of the input variable x can be written as follows:

$$V_o = -x - xG = -x\ (1+G) \tag{11}$$

where G is the gain of the circuit. However, G can be written as:
G=−R5/R1 which when substituted into equation provides:

$$V_o = -x(1-R5/R1) = x(R5/R1-1) \tag{12}$$

Figure 6:
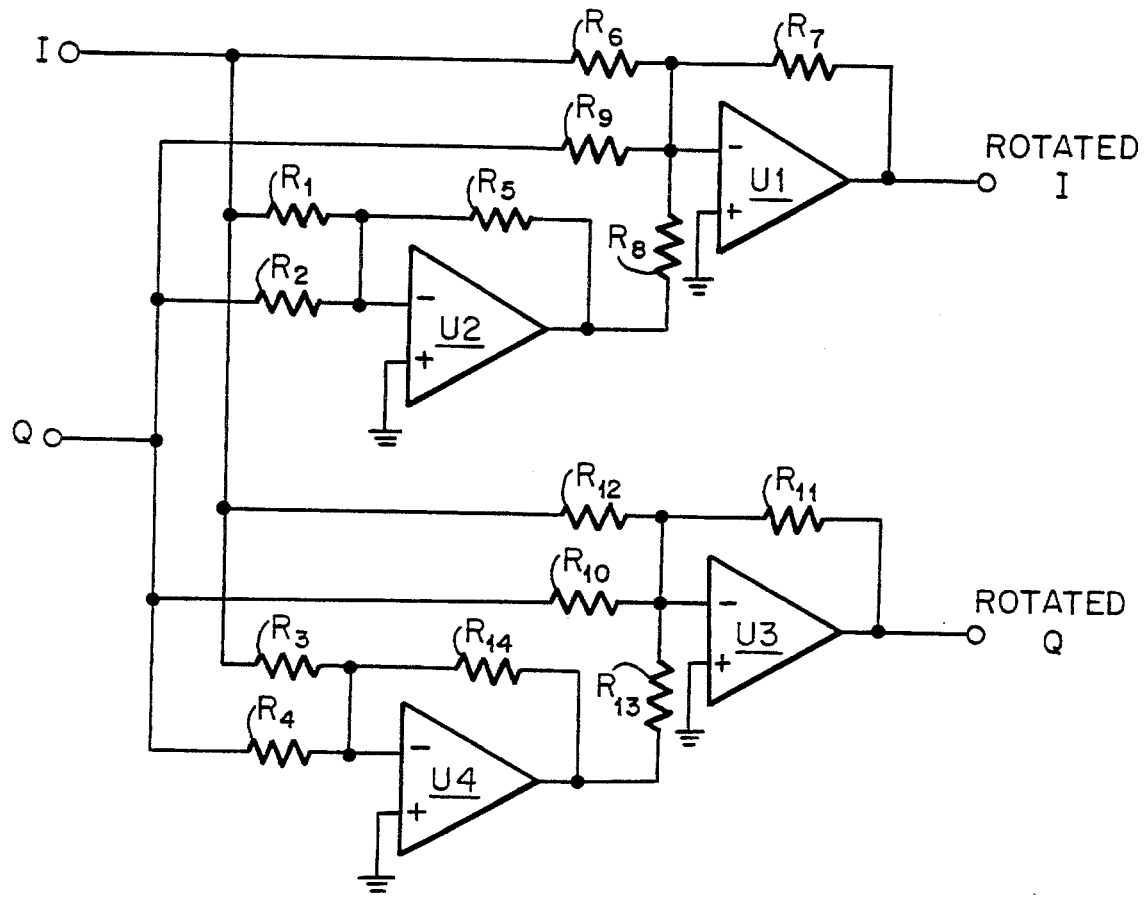
FIG. 6 is a circuit schematic illustrating an analog circuit representing the complete vector rotator of the present invention.

From equation (12), the resistance values for complete vector rotating can be determined. Referring to FIG. 6, the following can be implemented:

$$(R5/R1-1) = \text{Cos}\phi \tag{13}$$

$$(R5/R2-1) = -\text{Sin}\phi \tag{14}$$

$$(R14/R3-1) = \text{Sin}\phi \tag{15}$$

$$(R14/R4-1) = \text{Cos}\Phi \tag{16}$$

FIG. 6 is a circuit schematic of the analog circuit for the vector rotator in accordance with the present invention. Basically, the complete circuit includes two of the circuits illustrated in FIG. 5 in order to rotate both the i and q quadrature unit vectors. More specifically, the complete vector rotator circuit includes four operational amplifiers U1, U2, U3 and U4. The input i quadrature unit vector is input to the inverting input of amplifier U1 through resistor R6. Input i is also provided to the inverting input of amplifier U2 through resistor R1, the inverting input of amplifier U3 through resistor R12 and the inverting input of amplifier U4 through resistor R3.

The q quadrature unit vector is input to the inverting inputs of amplifiers U1, U2, U3 and U4 through resistors R9, R2, R10 and R4, respectively. The non-inverting inputs of each amplifier U1, U2, U3 and U4 are coupled to ground. Each amplifier also includes a feedback loop from its output through a resistor to its inverting input. Amplifiers U1 and U3 include in their feedback loops resistors R7 and R11, respectively. Amplifiers U2 and U4 include in their feedback loops resistors R5 and R14, respectively. Additionally, the outputs of amplifiers U2 and U4 are provided through resistors R8 and R13, respectively, to the inverting inputs of amplifiers U1 and U3, respectively. In the circuit of FIG. 6, resistors R6, R7, R8, R9, R10, R11, R12 and R13 have the same resistive value. Additionally, resistors R5 and R14 also have the same resistive value. Accordingly, amplifiers U1 and U3 provide an inverting unity gain, while the gain of amplifiers U2 and U4 can be adjusted by varying the resistive value of resistors R1, R2, R3 and R4.

As illustrated in FIG. 4, due to the operational amplifier configuration, the multiple inputs are summed by the amplifiers to provide a rotated vector quadrature unit i and q. Thus, by adjusting the values of resistors R1, R2, R3 and R4, while fixing the values of R5 and R14, the angular degree of rotation of the signal vector can be easily adjusted. Since the adjustments are made by varying a resistor value in the vector rotator circuit, rather than by conventional RF cable adjustments, the quadrature can be aligned without affecting the variation as a function of frequency. Previously, using known quadrature alignment means, the quadrature alignment would affect the amount of quadrature variation with changes in frequency. This disadvantage is overcome by the vector rotator of the present invention.

The operation of the interference cancellation system formed in accordance with the present invention will now be described. Auxiliary antenna 36 receives a reference signal substantially representing the interfering signal which results in the interfering signal component of the received signal provided to receiver transmission line 34 by receiver antenna 30. Reference coupler 38 provides a sample of the reference signal through the amplifier/limiter 44 to the first input port of synchronous detector 42. Substantially concurrently, error coupler 48 provides a sample of the received signal to the synchronous detector second input port. In addition, the signal controller 46 receives a sample of the reference signal from the auxiliary antenna 36 via line 40. Thereafter, the synchronous detector compares and correlates the reference signal sample to the received signal sample or error signal and generates control signals in response thereto. The control signals effectively represent phase and amplitude manipulations of the reference signal which would have to be invoked to effectively eliminate the interfering signal component from the received signal if the reference signal sample was injected onto the receiver transmission line.

The present invention includes a vector rotator 50 coupled to the output of the synchronous detector 42 for aligning the quadrature of the signal vector without affecting the variation as a function of frequency. Thus, the vector rotator enables the internal time match of the interference cancellation system to be optimized and then the phase position between the reference signal path and error signal path can be set independently of the time match. The vector rotator may include an integrator/amplifier coupled thereto to integrate the control signals output by the vector rotator. The control signals output by the vector rotator provide the signal controller with an aligned quadrature. The rotation of the quadrature position by the quadrature rotator is not a function of frequency, thus, the alignment can be set simply by adjusting resistive values in the vector rotator circuit.

As previously noted, the signal controller 46 consists of an in-phase and quadrature phase attenuator, being responsive to the control signals from the integrator 48. The signal controller generates and provides a cancellation signal to the summer coupler, which, in effect, injects the cancellation signal into the receiver signal path defined by the receiver antenna 30, transmission line 34 and receiver 32.

Although illustrative embodiments of the present invention have been described herein with reference to the accompanying drawings, it is to be understood that the invention is not limited to those precise embodiments, and that various other changes and modifications may be effected therein by one skilled in the art without departing from the scope or spirit of the invention.

I claim:

1. An interference cancellation system for reducing an interfering signal in a received signal on a transmission line to provide a desired signal to a receiver coupled to the transmission line, the interference cancellation system comprising:

a reference input port for receiving a reference signal substantially corresponding to the interfering signal;

a reference coupler having at least an input port and an output port, the input port of the reference coupler being operatively coupled to the reference input port, at least a portion of the reference signal being provided to the input port of the reference coupler, the reference coupler output port generating thereon a reference signal substantially corresponding to at least a portion of the reference signal;

an error coupler having at least an input port and an output port, the input port of the error coupler being operatively coupled to the transmission line for receiving a sample of the received signal, the received signal substantially corresponding to a combination of the desired signal and the interfering signal, the error coupler output port generating thereon an error signal substantially corresponding to the received signal;

a synchronous detector, the synchronous detector having first and second output ports and first and second input ports, the first and second input ports respectively electrically coupled to the reference coupler and the error coupler and being responsive to the reference signal and error signal, the synchronous detector determining a phase relationship between the reference signal and the error signal, the synchronous detector generating first and second output signals respectively provided on the synchronous detector first and second output ports;

a vector rotator having at least a first and second output port and a first and second input port, the first and second input ports being electrically coupled to the first and second output ports of the synchronous detector respectively, for receiving the first and second synchronous detector output signals, the vector rotator providing quadrature alignment of the first and second synchronous detector output signals and generating an output rotated vector signal therefrom;

a signal controller having at least a first input electrically coupled to the reference input port and a second input electrically coupled to the outputs of the vector rotator and being responsive to the rotated vector signal, the signal controller having an output and providing thereon a cancellation signal in response to the rotated vector signal; and a summing coupler having at least an input port and an output port, the summing coupler output port providing the cancellation signal to the transmission line.

2. An interference cancellation system as defined by claim 1, wherein the synchronous detector output signals are a signal vector comprising quadrature components and wherein the vector rotator aligns the quadrature components independent of frequency variations.

3. An interference cancellation system as defined by claim 2, wherein the vector rotator comprises an analog circuit to rotate the signal vector quadrature components.

4. An interference cancellation system as defined by claim 3, wherein the vector rotator aligns the quadrature components by resistor value adjustment in the analog circuit of the vector rotator.

5. An interference cancellation system as defined by claim 4, wherein the signal vector is rotated a predetermined number of degrees by a specific resistor value.

6. An interference cancellation system as defined by claim 1, wherein said signal controller further includes an integrator for integrating the first and second synchronous detector output signals rotated by the vector rotator.

7. An interference cancellation system for cancelling an interfering signal received by a radio receiver system, the radio receiver system having a radio receiver, a receiving antenna, and a receiver transmission line coupling the receiving antenna to the receiver, the interference cancellation system comprising:

an auxiliary antenna for receiving a sample of an interfering signal;

a reference coupler coupled to the auxiliary antenna, the reference coupler generating a reference signal thereon substantially corresponding to the sample of interfering signal received by the auxiliary antenna;

a sampler coupler coupled to the receive transmission line, the sampler coupler sampling an interfering signal and desired signal received by the radio receiver system and generating an error signal in response thereto;

a synchronous detector, the synchronous detector being responsive to the reference signal and the error signal and generating a control signal in response thereto;

a vector rotator, the vector rotator being responsive to the synchronous detector control signal, the vector rotator providing quadrature alignment for the control signal and generating a rotated vector signal in response thereto;

a signal controller, the signal controller being responsive to the reference and the rotated vector signals and generating a cancellation signal in response thereto; and a summer coupler, a summer coupler coupled to the receive transmission line, the summer coupler injecting the cancellation signal into the receive transmission line to substantially cancel an interfering signal present in the radio receiver system.

8. An interference cancellation system as defined by claim 7, wherein the signal controller further includes an integrator for providing an integrated rotated vector signal.

9. An interference cancellation system as defined by claim 7, wherein the synchronous detector output signal is a signal vector comprising quadrature components and wherein the vector rotator aligns the quadrature components independent of frequency variations.

10. An interference cancellation system as defined by claim 9, wherein the vector rotator comprises an analog circuit to rotate the signal vector quadrature components.

11. An interference cancellation system as defined by claim 10, wherein the vector rotator aligns the quadrature components by resistor value adjustment in the analog circuit of the vector rotator.

12. A method for substantially cancelling an interfering signal component from a received signal, the method comprising:

sampling an interfering signal which results in the interfering signal component of the received signal, and providing a reference signal corresponding thereto;

sampling the received signal, the received signal including the interfering signal component, and providing an error signal corresponding to the interfering signal component;

comparing and correlating the reference signal with the error signal and generating a first and second control signals in response thereto;

adjusting the time match of the first and second control signals;

adjusting the phase position and amplitude of the first and second control signals independently of the time match;

generating a cancellation signal corresponding to the time match and phase and amplitude adjusted reference signal, the cancellation signal being substantially equal in amplitude and opposite in phase to the interfering signal component of the received signal; and summing the cancellation signal and the received signal so as to effectively cancel the interfering signal component of the received signal.

\* \* \* \* \*